United States Patent [19]
Grace

[11] Patent Number: 5,626,352
[45] Date of Patent: May 6, 1997

[54] COLLAPSIBLE AND FOLDABLE CART HAVING A STABILIZATION MEMBER

[76] Inventor: John Grace, 558 W. Scott Ave., Rahway, N.J. 07065

[21] Appl. No.: 518,045

[22] Filed: Aug. 22, 1995

[51] Int. Cl.$^6$ .............................. B62B 1/04; B62B 1/12
[52] U.S. Cl. ..................... 280/47.29; 280/652; 280/655
[58] Field of Search ................................ 280/655.1, 655, 280/654, 652, 47.29, 47.28, 47.19, 645, 47.33

[56] References Cited

U.S. PATENT DOCUMENTS

| | | | |
|---|---|---|---|
| 2,363,619 | 11/1944 | Prieto | 280/30 |
| 3,052,484 | 9/1962 | Huffman et al. | 280/36 |
| 4,526,399 | 7/1985 | Holtz | 280/655 |

*Primary Examiner*—Brian L. Johnson
*Assistant Examiner*—Bridget Avery
*Attorney, Agent, or Firm*—Ezra Sutton

[57] ABSTRACT

A collapsible, foldable cart, having a frame with spaced-apart first and second longitudinal frame members defining a plane, and a pair of wheels and a wheel axle connected to the frame. The cart has two foldable shelf members pivotally connected to the frame which are movable between a first position for carrying a load on the shelf member, and a second position wherein the shelf member is disposed in a vertical plane and is between the first and second longitudinal frame members. The cart also includes a handle section pivotally connected to the frame and movable between a first position wherein the handle section is disposed in an operative position in the vertical plane and a second position wherein the handle section is rotated approximately 180° degrees from the first position towards the frame to fold-up and collapse the handle section. The cart further includes a bottom-most stabilizing shelf member pivotally connected to the frame and movable between a first position for carrying a load on the stabilizing shelf member and a second position wherein the stabilizing shelf member is folded towards the frame to fold-up and collapse the cart. In addition, there is a stabilizing member connected to the bottom-most stabilizing shelf member which is detachably connected to the wheel axle, so that when the stabilizing member is detached from the wheel axle, it may be actuated to move the bottom-most stabilizing shelf member from a first position to a second position.

6 Claims, 11 Drawing Sheets

COLLAPSIBLE AND FOLDABLE CART HAVING A STABILIZATION MEMBER

FIELD OF THE INVENTION

This invention relates to a collapsible and foldable cart for the manual transporting of various kinds of goods and articles. More particularly, this invention relates to a lightweight, foldable cart having a stabilization member at its bottom end.

BACKGROUND OF THE INVENTION

Several types of collapsible and foldable carts for transporting articles or goods have been utilized in the past. Generally, these types of foldable carts are used by home owners for transporting of groceries, packages, luggage, duffle bags, ski bags, bowling bags, baseball storage bags, and the like. These foldable carts are also used for commercial and light industry usage in the transporting of in process goods, finished products, and the like. The collapsible and foldable nature of these carts provides for easy storage in a vehicle trunk, a storage closet, on a wall, and the like. These carts permit the transport of goods up and down walkways, stairs, escalators, steep hills, dirt trails, and the like, without causing damage to walkway surfaces, such as linoleum, tile, wood, or carpeting.

There remains a need for a collapsible and foldable cart or manual hand truck that is stable during use by having a bottom stabilization member.

DESCRIPTION OF THE PRIOR ART

Foldable and collapsible carts of various designs, styles and materials of construction have been disclosed in the prior art. For example, U.S. Pat. No. 4,526,399 to Holtz discloses a cart support for computer printouts having foldable lower and upper shelves, such that the lower shelf folds upwardly into the vertical plane about an upper pivot point and the upper shelf folds downwardly into the vertical plane about a lower pivot point. The cart is readily folded into a compact storage condition when not in use. This prior art structure does not show a U-shaped bottom stabilizing member which is releasably attached to the wheel axle as in the present invention which allows the bottom shelf to fold upwardly into the vertical plane.

U.S. Pat. Nos. 2,363,619 and 3,052,484 both disclose foldable utility carts, hand trucks, or carriers for carrying multiple items. Both carts have bottom support members that fold upwardly into the vertical plane about an axle pivot point and upper support members that can fold in either an upward or downward direction into a vertical plane about an axle pivot point. These prior art patents are typical of hand trucks/carts having foldable shelves, but they do not have the structural features of the present invention such as a bottom stabilizing member for releasable detachment from the wheel axle which allows the bottom shelf to fold upwardly into the vertical plane.

None of the prior art patents disclose a combination of a collapsible and foldable cart having a plurality of foldable shelves, an upper foldable handle that folds downwardly into the vertical plane, and a U-shaped stabilizing member on the bottom of the frame which is releasably attached to the wheel axle to allow the bottom most shelf to fold upwardly. Also the stabilizing member is foldable to allow collapsing of the cart/hand truck into a small compact configuration for easy storage.

Accordingly, it is an object of the present invention to provide for a collapsible and foldable cart which is lightweight, easily collapsed for storage, and easily stabilized for operational use.

Another object of the present invention is to provide for a collapsible and foldable cart that is easy to assemble, and use for the transport of multiple articles or goods, over a variety of terrains.

An even further object of the present invention is to provide a collapsible and foldable cart that can be mass produced in an automated and economical manner and is readily affordable by the consumer/user.

SUMMARY OF THE INVENTION

In accordance with the present invention, there is provided an improved collapsible and foldable cart having a stabilization member. The collapsible, foldable cart includes a frame having spaced-apart first and second longitudinal frame members defining a plane; and a pair of wheels and a wheel axle connected to the frame. The frame structure can be made from materials such as plastic, aluminum, steel, stainless steel, or fiberglass in a tubular or flat-bar form. The wheels can be made from rubber, or a pliable, flexible plastic for good traction.

The cart has at least one foldable shelf member pivotally connected to the frame and is movable between a first position for carrying a load on the shelf member and a second position wherein the shelf member is disposed in the vertical plane and between the first and second longitudinal frame members.

The cart also has a handle section pivotally connected to the frame and movable between a first position wherein the handle section is disposed in an operative position in the vertical plane and a second position wherein the handle section is rotated approximately 180° from the first position towards the frame to fold-up and collapse the handle section into the frame.

The cart also includes a bottom-most stabilizing shelf member pivotally connected to the frame and movable between a first position for carrying a load on the stabilizing shelf member and a second position wherein the stabilizing shelf member is folded-up and collapsed into the cart frame.

The cart further includes a stabilizing member connected to the bottom-most stabilizing shelf member and detachably connected to the wheel axle so that when the stabilizing member is detached from the wheel axle, it may be actuated to move the bottom-most stabilizing shelf member from the first position to the second position. The stabilizing member includes a pair of notches for detachably connecting the stabilizing member to the wheel axle.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

3

DETAILED DESCRIPTION OF THE PREFERRED EMBODIMENT

Figure 1:
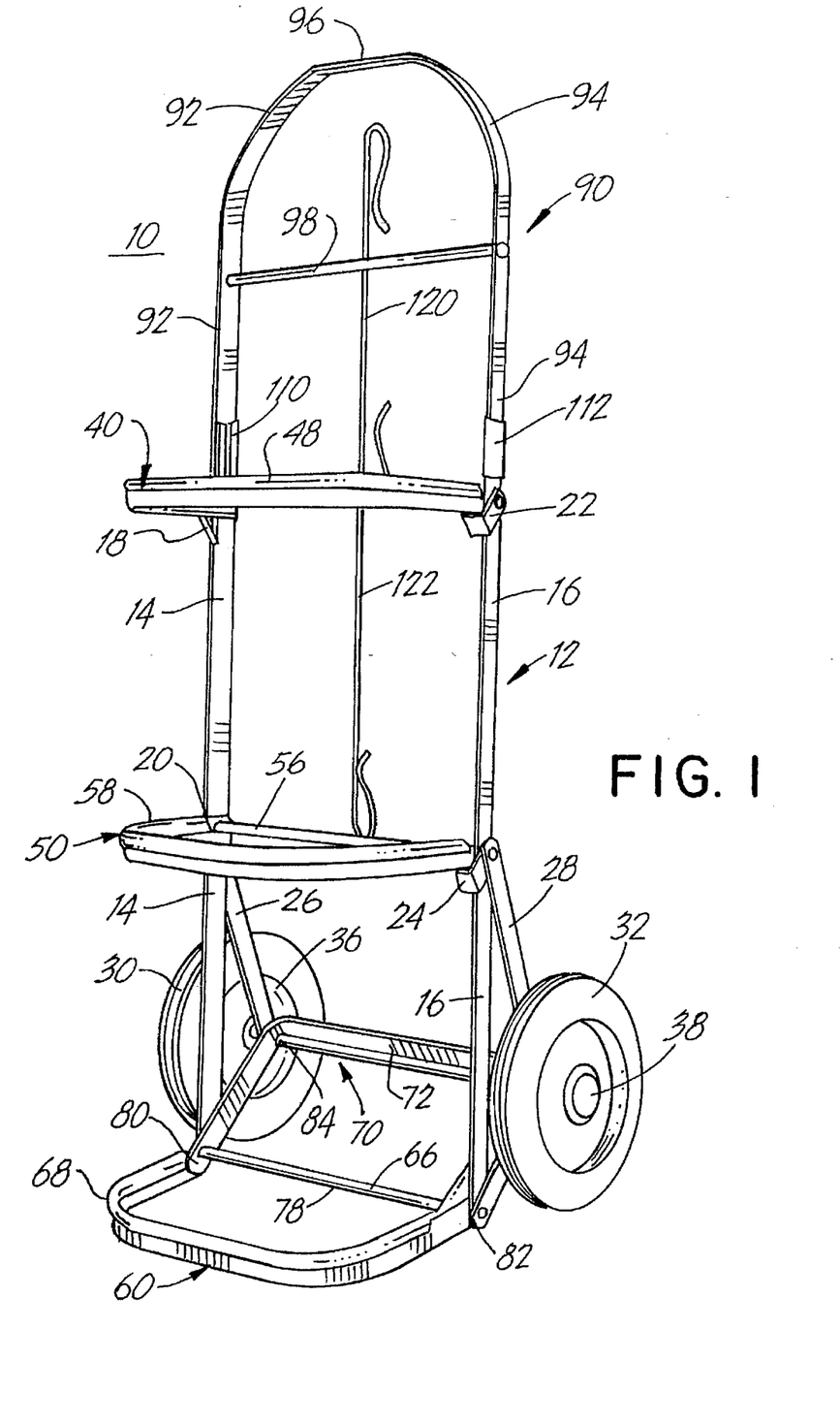
FIG. 1 is a perspective view of the collapsible, foldable cart of the present invention showing it in the assembled and operational mode.
Figure 2:
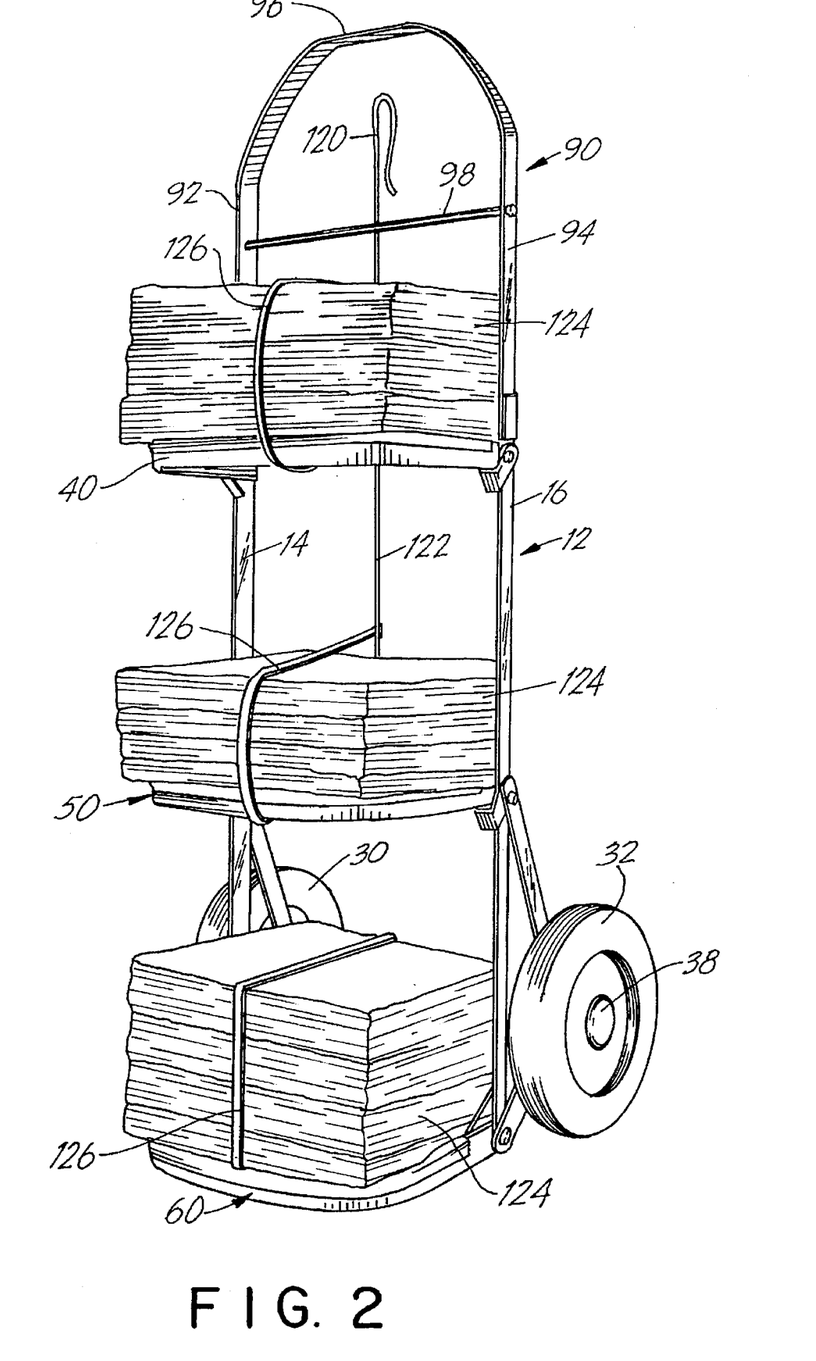
FIG. 2 is a perspective view of the collapsible, foldable cart in operational use with the shelves carrying a load.
Figure 3:
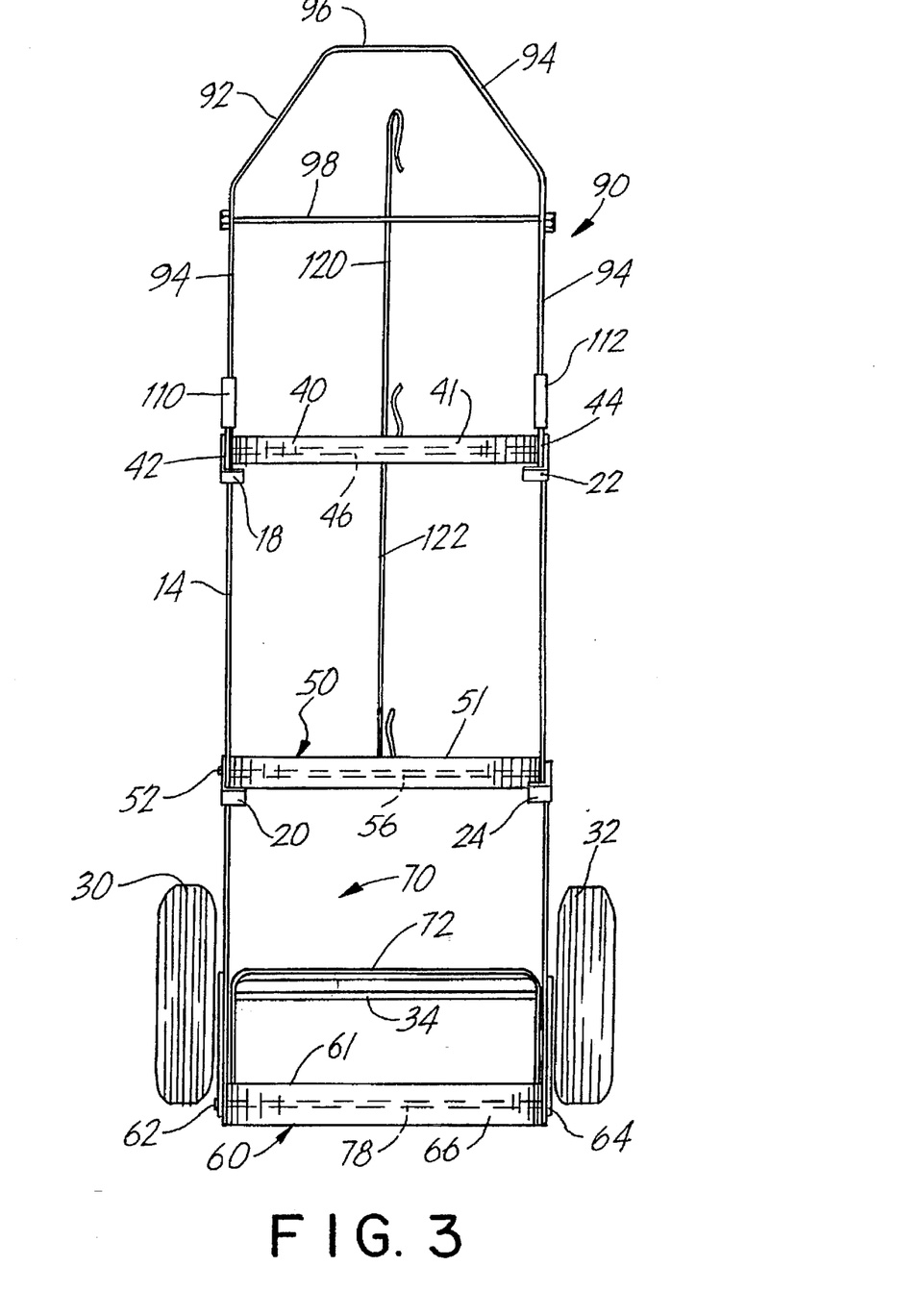
FIG. 3 is a front elevational view of the collapsible, foldable cart showing it in a fully opened mode.
Figure 8:
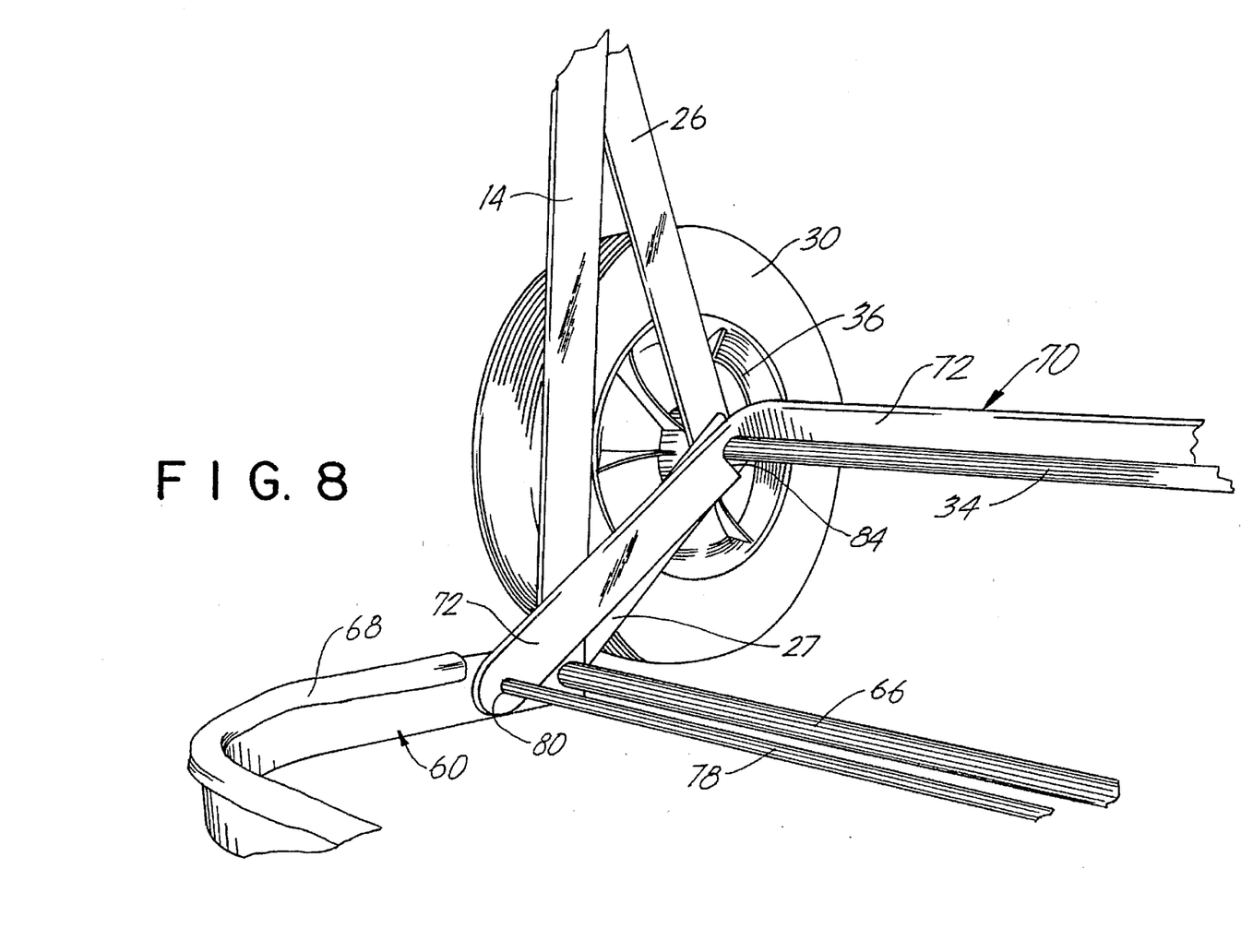
FIG. 8 is a front perspective view of the bottom-most stabilizing shelf, the stabilizing member and a wheel which shows these component parts in their engaged and assembled mode.
Figure 9:
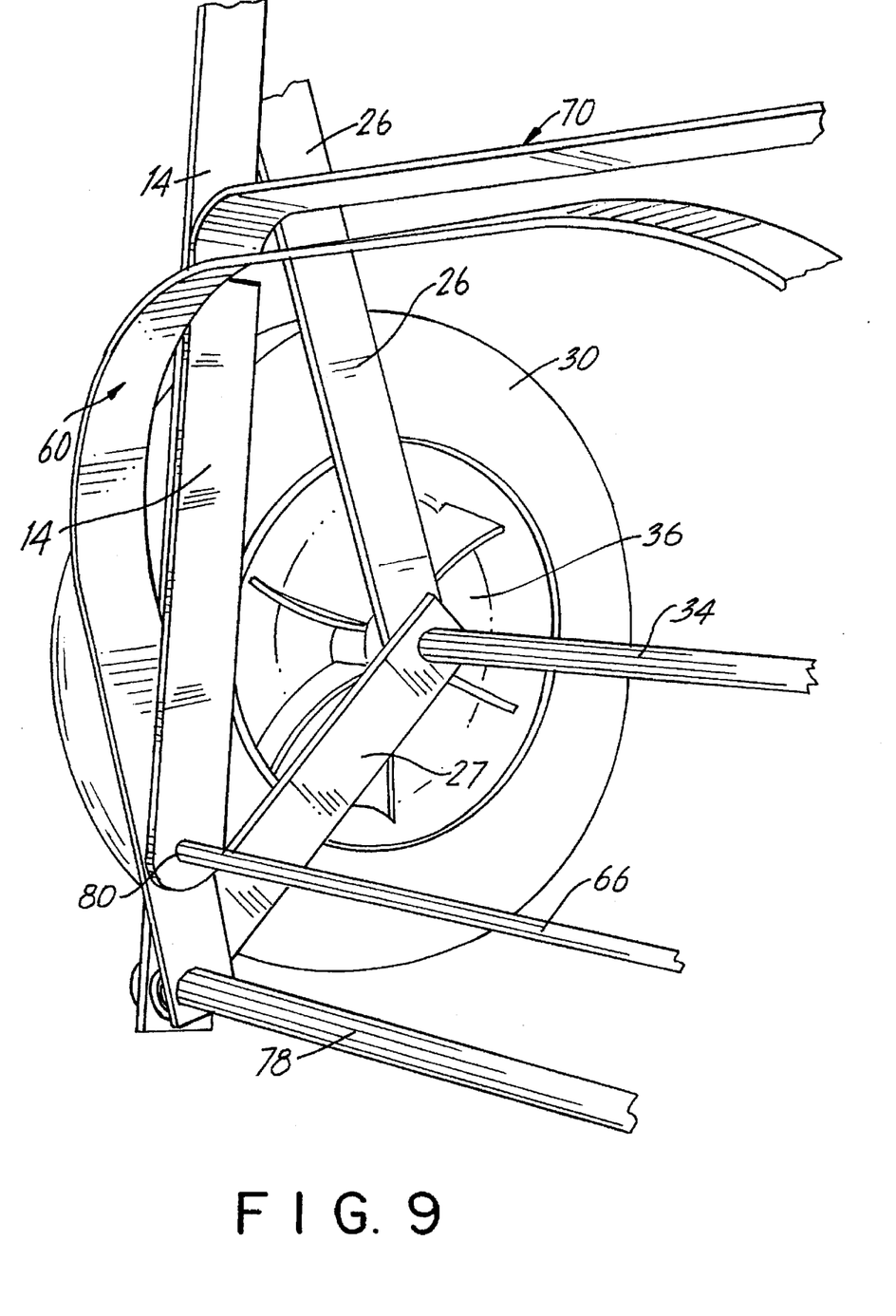
FIG. 9 is a front perspective view of the bottom-most shelf, the stabilizing member and a wheel which shows these component parts in their disengaged and collapsed mode.
Figure 10:
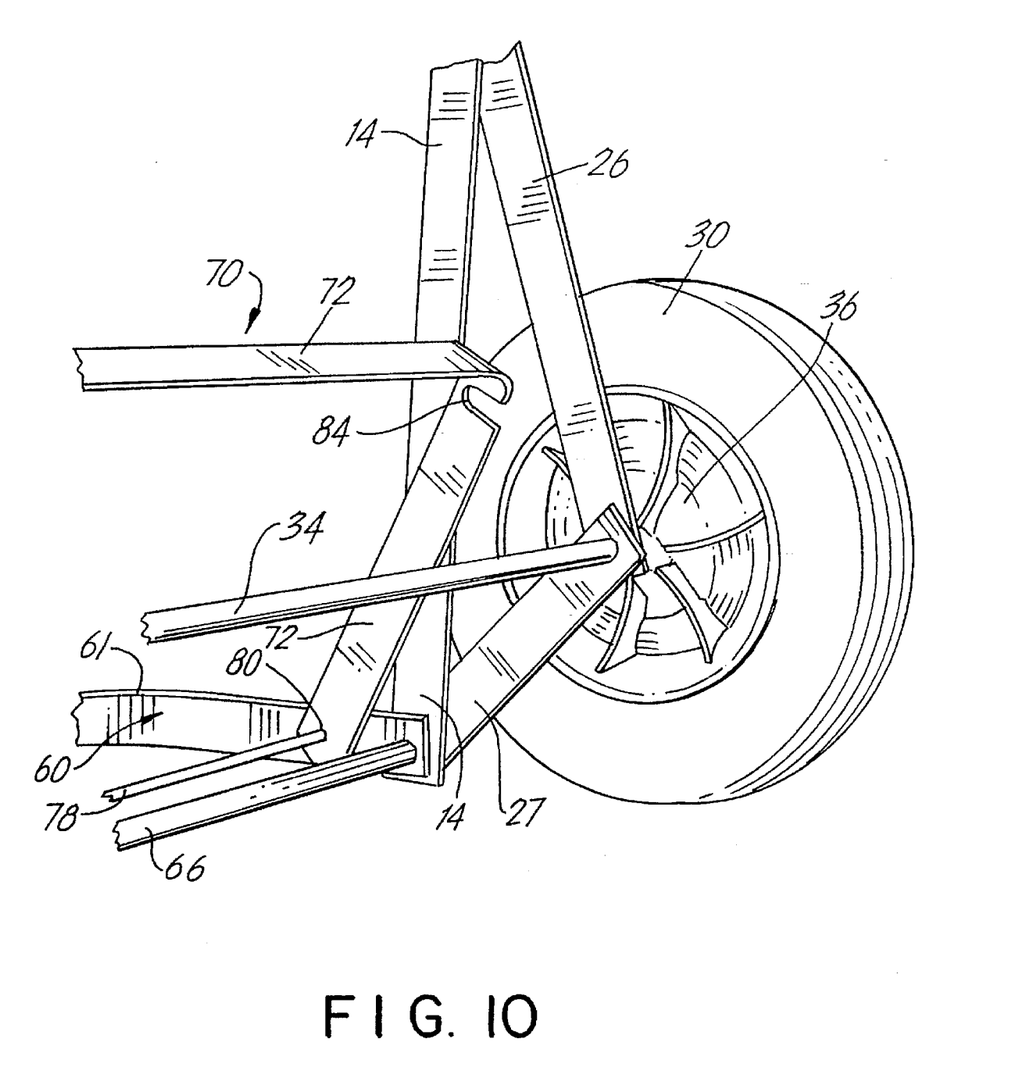
FIG. 10 is a rear perspective view of the bottom-most shelf, the stabilizing member and a wheel which shows these component parts in their disengaged and collapsed mode.
Figure 11:
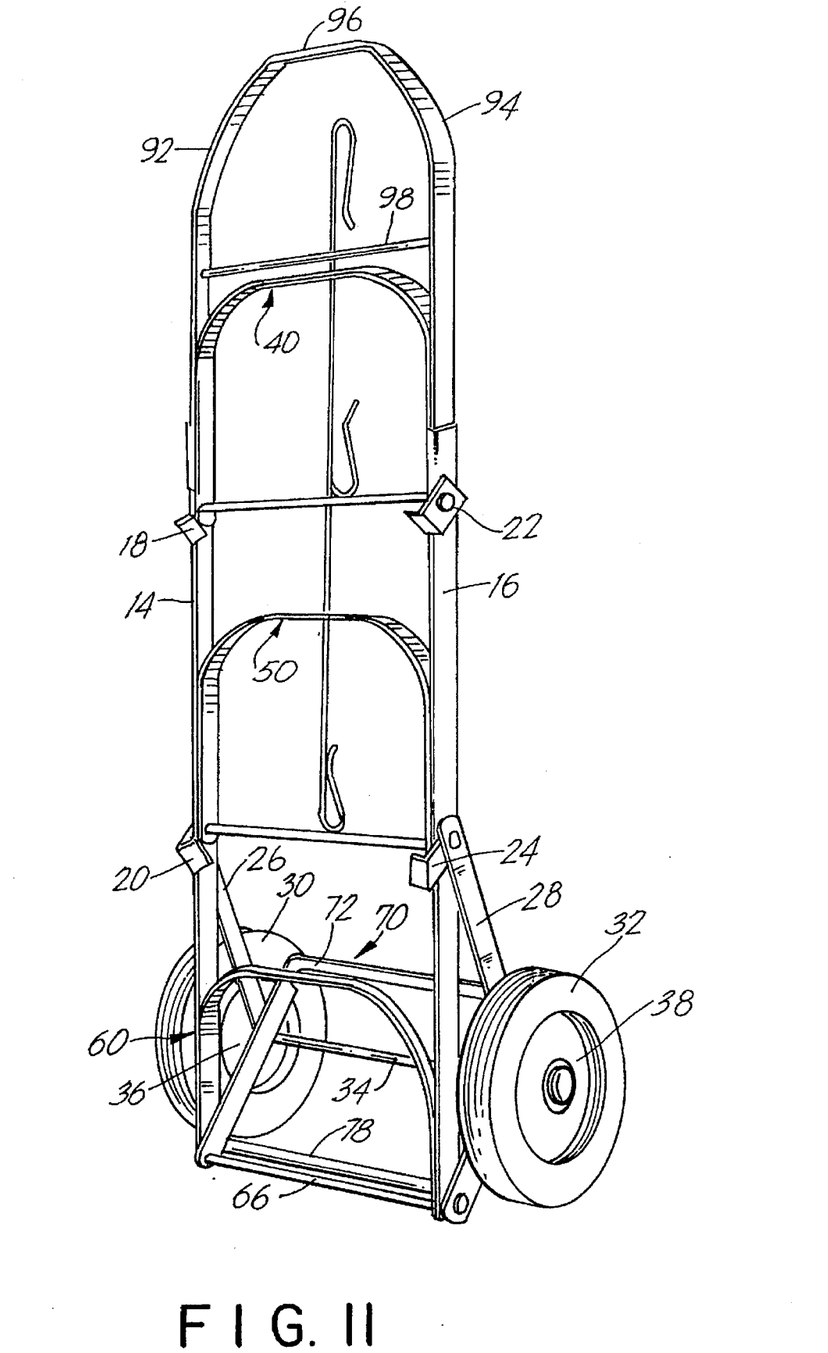
FIG. 11 is a front perspective view of the collapsible, foldable cart of the present invention showing its foldable shelves in a folded-up and closed position.
Figure 12:
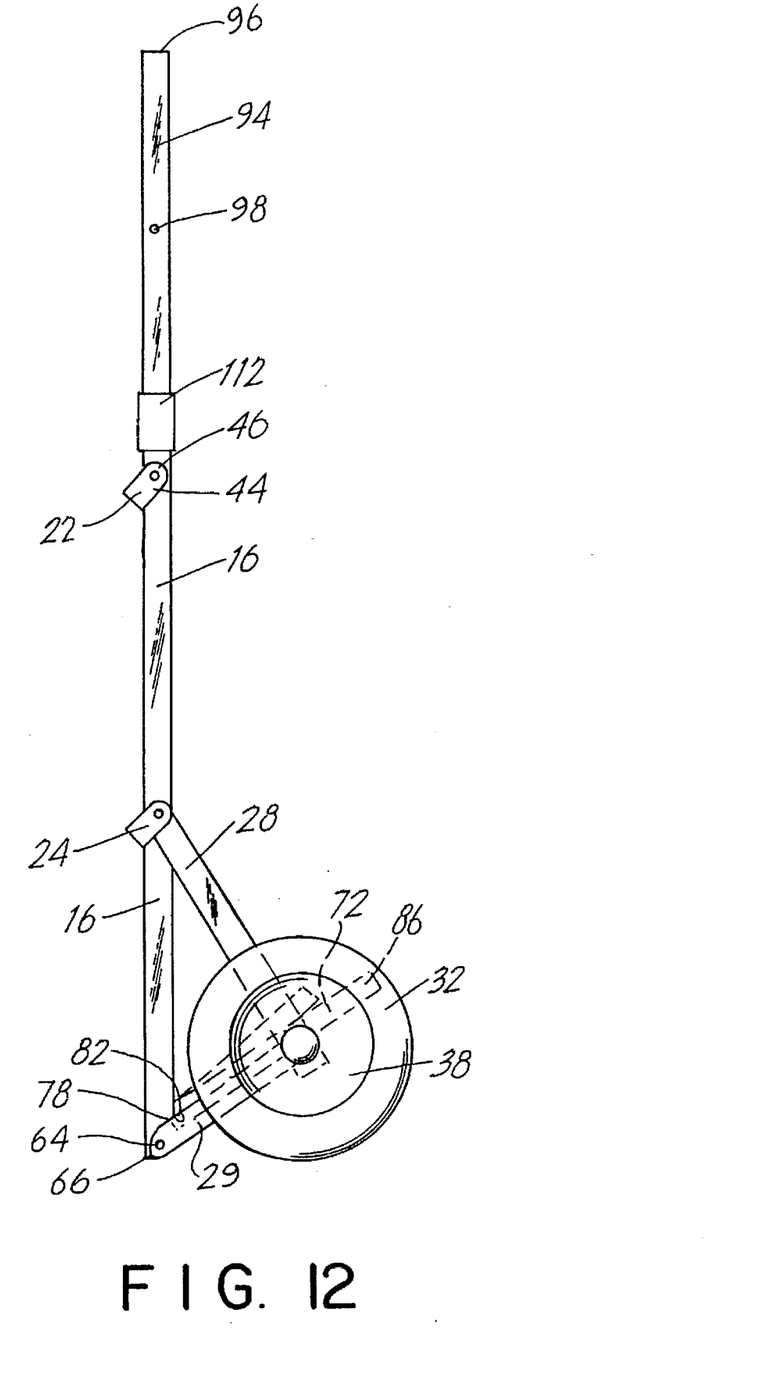
FIG. 12 is a side elevational view of the collapsible, foldable cart showing its shelves in a folded position in the vertical plane.

The preferred embodiment of the present invention provides for a collapsible, foldable cart 10, as represented in FIGS. 1 through 12. FIGS. 1 and 2 shows the foldable cart 10 in a fully opened position without and with a load being carried. Collapsible, foldable cart 10 comprises a frame 12 having spaced-apart first and second longitudinal frame members 14 and 16 defining a plane; and a pair of wheels 30 and 32, and a wheel axle 34 connected to the frame 12 through wheel hubs 36 and 38, as depicted in FIGS. 1 through 4. Frame 12 includes longitudinal frame members 14 and 16 used for placing foldable shelves 40 and 50 at a given height location, and angled members 18, 20, 22, and 24 for holding the foldable shelves 40 and 50 in a horizontal position, and bottom members 26 and 28 for bracing the wheels 30 and 32 to frame 12 via longitudinal frame members 14 and 16, as depicted in FIGS. 8, 9, and 10. There are also bottom-angled members 27, 29 which are connected at one end to the longitudinal frame members 14 and 16 and shelf axle 56 and at the other end are connected to the bottom members 26 and 28 and wheel axle 34 giving bottom shelf 60 structural support, as depicted in FIG. 9 of the drawings.

Cart 10 also includes foldable upper and lower U-shaped shelf members 40 and 50 which are pivotally connected to frame 12 and are each movable between a first position for carrying a load on the shelf members 40 and 50; and a second position wherein the shelf members 40 and 50 are folded upwardly and are disposed within the vertical plane of the first and second longitudinal frame members 14 and 16.

Upper shelf member 40 is connected to frame 12 at pivot points 42 and 44 about upper shelf axle 46. Shelf member 40 has an upper edge 41 covered with a pliable U-shaped rubber anti-slide strip 48 which prevents loaded goods from sliding off the shelf 40 or edge 41 from marring the goods being carried, if the strip 48 was not present.

Lower shelf member 50 is connected to frame 12 at pivot points 52 and 54 about lower shelf axle 56. Shelf member 50 has an upper edge 51 covered with an anti-slide strip 58 which prevents loaded goods from sliding off shelf 50.

4

Cart 10 also includes a bottom-most stabilizing shelf member 60 pivotally connected to frame 12 and movable between a first position for carrying a load on the stabilizing shelf member 60 and a second position wherein the stabilizing shelf member 60 is folded toward the frame 12 to fold-up and collapse the cart 10. Shelf member 60 is connected to the bottom-end of longitudinal members 14 and 16 of frame 12 at pivot points 62 and 64 about shelf axle 66. Shelf member 60 has an upper edge 61 covered with an anti-slide strip 68 which prevents loaded goods from sliding off shelf 60.

In addition, cart 10 includes a stabilizing member 70 having a U-shaped member 72 pivotally connected at pivot points 74 and 76 to shelf member 60 about stabilizing member axle 78 via axle openings 80 and 82. U-shaped member 72 has notches 84 and 86 formed therein for engaging or disengaging wheel axle 34. Stabilizing member 70 is connected to the bottom-most stabilizing shelf member 60 and is detachably connected to the wheel axle 34, so that when the stabilizing member 70 is detached from the wheel axle 34, it may be actuated to move the bottom-most stabilizing shelf member 60 from a load-carrying position to a second position adjacent to the longitudinal frame members 14 and 16 of frame 12, as shown in FIGS. 8, 9, and 10. When stabilizing member 70 is engaged, it prevents the cart 10 from tipping over during use.

Figure 4:
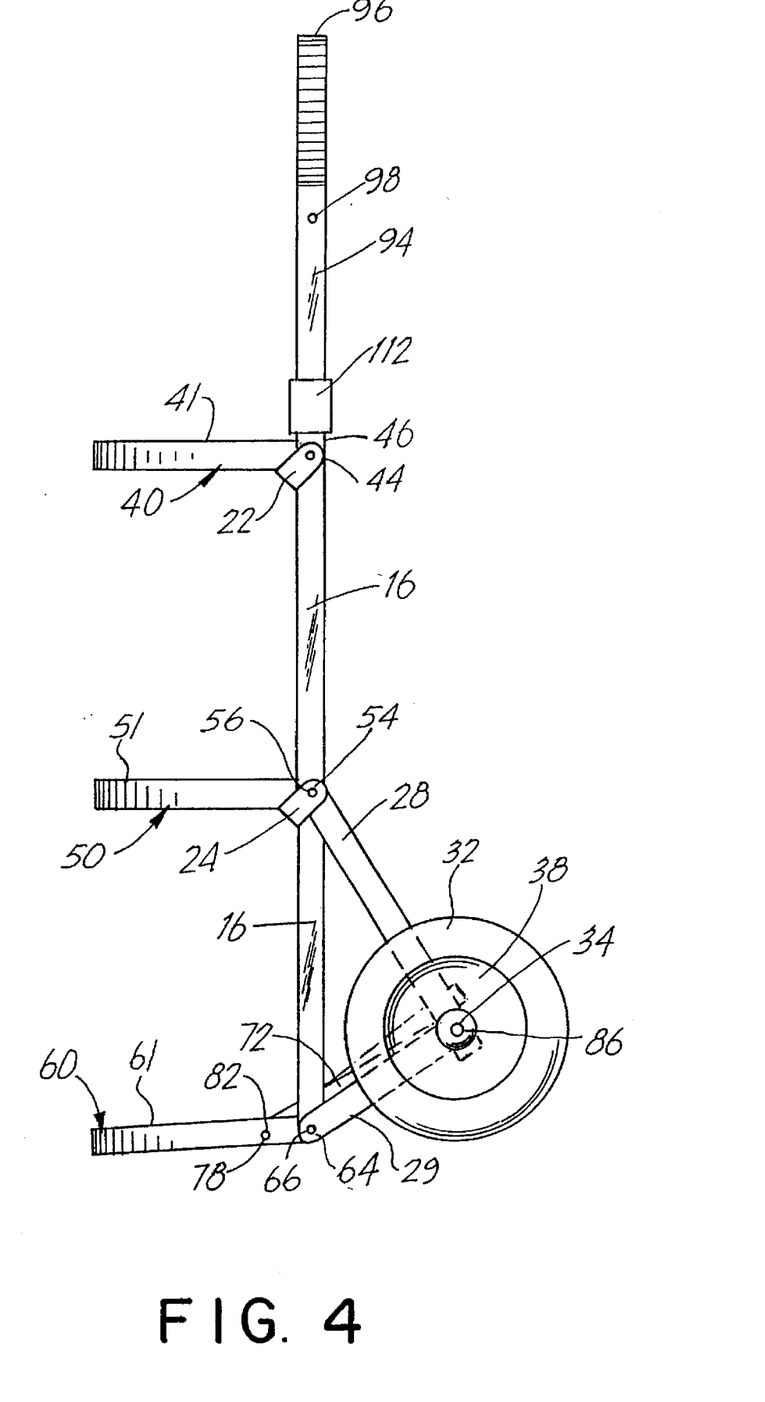
FIG. 4 is a side elevational view of the collapsible, foldable cart showing it in a fully opened mode.
Figure 5:
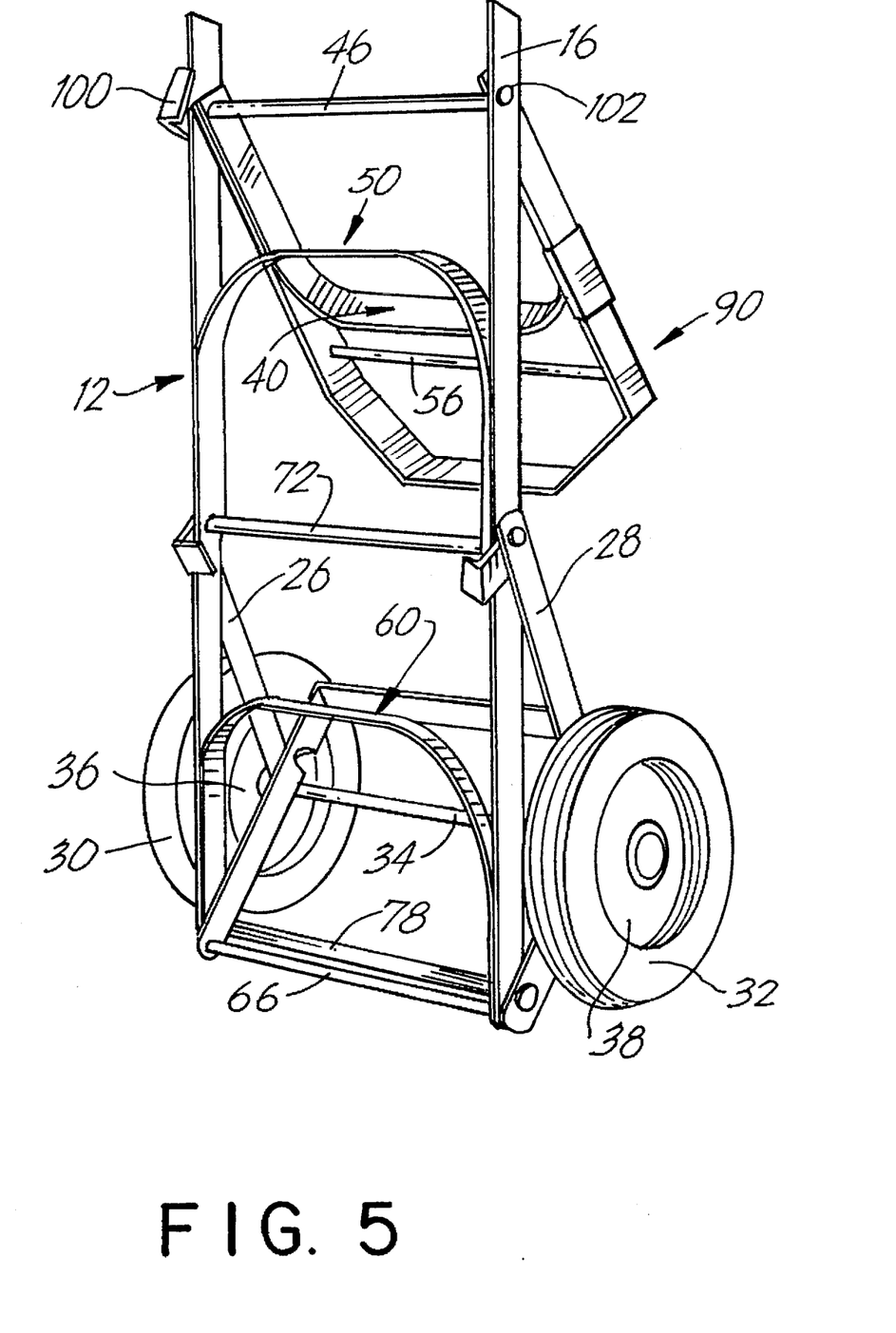
FIG. 5 is a perspective view of the collapsible, foldable cart of the present invention showing it in a folded-up and collapsed mode.
Figure 6:
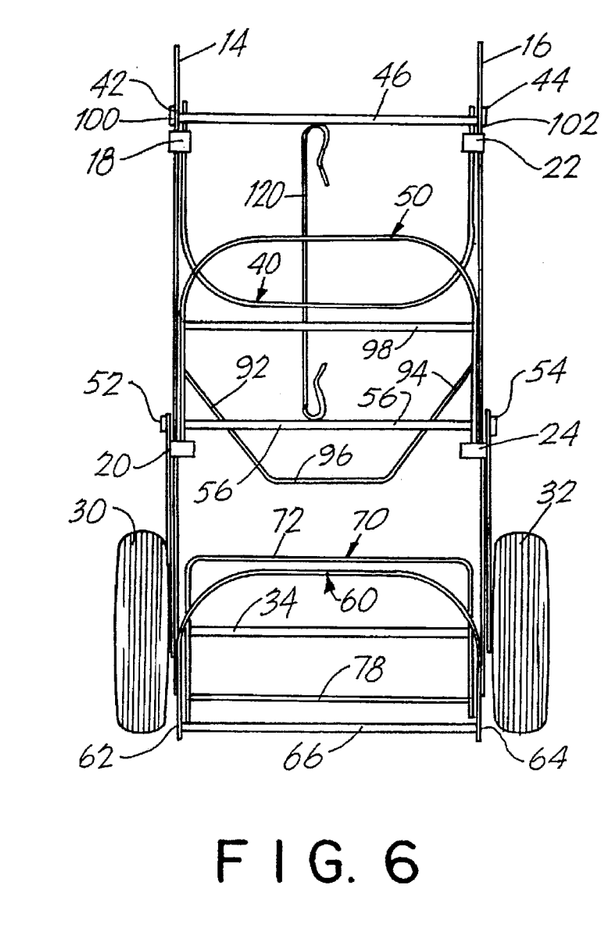
FIG. 6 is a front elevational view of the collapsible, foldable cart showing it in a fully collapsed mode.
Figure 7:
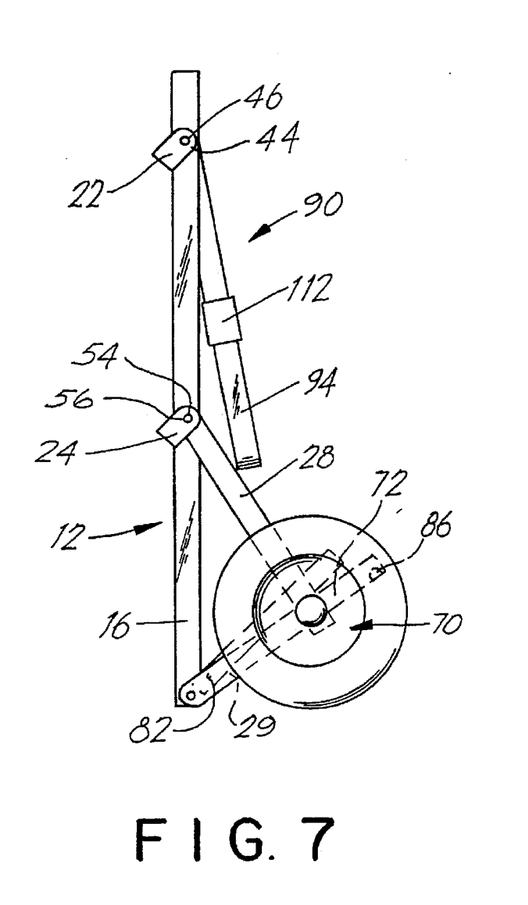
FIG. 7 is a side elevational view of the collapsible, foldable cart showing it in a fully collapsed mode.

Cart 10 further includes a handle section assembly 90 having longitudinal members 92 and 94 and horizontal members 96 and 98. Handle section 90 is pivotally connected to frame 12 at pivot points 100 and 102 about upper shelf axle 46 and is movable to a first position wherein the handle section 90 is disposed in an operative position in the vertical plane, as depicted in FIGS. 1 to 4. There is a second position which shows the handle section 90 being rotated approximately 180° degrees from the first position toward the frame 12 to fold-up and collapse the handle section 90 against frame 12 which shows the handle assembly in a compact configuration, as depicted in FIGS. 5 to 7. Collar members 110 and 112 are slidably disposed on longitudinal frame members 14 and 16 of frame 12 and also slidably disposed on longitudinal members 92 and 94 of handle section 90, such that the collar members 110 and 112 are movable between an engaged and disengaged position. When collar member 110 and 112 are in the disengaged position, this allows the handle section 90 to move between the first and second positions, as shown in FIGS. 1 through 7 of the drawings. Handle section 90 also includes a rubber handle grip 104 disposed on the upper horizontal member 96 for pulling or pushing of cart 10 when carrying a load.

Cart 10 further includes upper and lower vertical tie-down rods 120 and 122 integrally attached to horizontal member 98 and axle 56 for securing of various articles and goods 124 by a rubber strap or bungee cord 126, as shown in FIG. 2. The above tie-down rods 120 and 122 can be replaced by securing clips (not shown) to horizontal member 98 and axles 48 and 56.

The frame members 14 and 16 of frame structure 12 and longitudinal and horizontal members 92, 94, 96, 98 of handle section 90 can be made from materials such as plastic, fiberglass, aluminum, steel, stainless steel, or wrought iron in a tubular or flat-bar form. The wheels 30 and 32 can be made from rubber, or a pliable, flexible plastic for good traction.

The physical measurements of cart 10 in a fully opened mode are a width of 11¾ inches and a height of 40⅜ inches; and shelves 40, 50, and 60 project out about 7 inches from frame 12. The shelves 40 and 50 and shelves 50 and 60 are equally spaced at a distance of 12½ inches each, as depicted in FIG. 4. In the preferred embodiment, the frame structure 12, the handle section's longitudinal and horizontal members 92, 94, and 96 and shelves 40, 50, and 60 are all made from a flat bar steel having a width measurement of 1 inch and a thickness of an ⅛ of an inch. The cart 10 has 8 inch rubber wheels and wheels 30 and 32 have a 14½ inch wheel base.

The cart 10 in a fully closed mode has configuration measurements of 11¾ inches wide by a folded height measurement of 28 9/16 inches and a depth measurement of 10 inches at the widest point, as shown in FIG. 7 of the drawings. The handle section 90 has a width measurement of 11¾ inches and a height measurement of 11 3/16 inches. All linear measurements have a tolerance of ±⅛ of an inch.

OPERATION OF THE PRESENT INVENTION

In operation the collapsible, foldable cart 10 is readily put into operational use from a collapsed mode by initially moving handle section 90 upwardly 180° degrees from frame 12, as shown by FIGS. 7 and 10. The collar members 110 and 112 are then slid over longitudinal members 14 and 16 of frame 12 to lock handle section 90 and frame 12 in the same vertical plane. The shelves 40, 50, and 60 are then folded downwardly 90° degrees from frame 12, as depicted in FIG. 4.

Lastly, the stabilizing member 70 is engaged by moving U-shaped member 72 to engage wheel axle 34 via notches 84 and 86. Cart 10 is ready for operational use, such that loads 124 can be placed on shelves 40, 50, and 60 and secured by a plurality of bungee cords 126 tied to the tie-down rods 120 and 122, as shown in FIG. 2.

To collapse and fold-up cart 10 the shelves 40 and 50 are folded upwardly, then the stabilizing member 70 is released from axle 34, and shelf 60 is then moved upwardly. Lastly, collar members 110 and 112 are slid off handle section 90 so that handle section 90 may be folded downwardly toward frame 12. Cart 10 is now in a compact configuration and can now be placed away in storage, as shown in FIG. 5.

ADVANTAGES OF THE PRESENT INVENTION

Accordingly, the primary advantage of the present invention is that is provides for a collapsible and foldable cart which is light-weight, easily collapsed for storage, and easily stabilized for operational use by the stabilizing member 70.

Another advantage of the present invention is that it provides for a collapsible and foldable cart that is easy to assemble and use for the transport of multiple articles or goods, over a variety of terrains.

An even further advantage of the present invention is that it provides for a collapsible and foldable cart that can be mass produced in an automated and economical manner and is readily affordable by the consumer/user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A collapsible, foldable cart, comprising:
   a) a frame having spaced-apart first and second longitudinal frame members defining a plane, and a pair of wheels and a wheel axle connected to said frame;
   b) at least one foldable shelf member pivotally connected to said frame and movable between a first position for carrying a load on said shelf member, and a second position wherein said shelf member is disposed in said plane and is between said first and second longitudinal frame members;
   c) a handle section pivotally connected to said frame and movable between a first position wherein said handle section is disposed in an operative position in said plane and a second position wherein said handle section is rotated approximately 180° degrees from said first position toward said frame to fold-up and collapse said handle section;
   d) a bottom-most stabilizing shelf member pivotally connected to said frame and movable between a first position for carrying a load on said stabilizing shelf member and a second position wherein the stabilizing shelf member is folded toward said frame to fold-up and collapse said cart; and
   e) a stabilizing member connected to said bottom-most stabilizing shelf member and detachably connected to said wheel axle, so that when said stabilizing member is detached from said wheel axle, said stabilizing member may be actuated to move said bottom-most stabilizing shelf member from said first position to said second position.

2. A collapsible, foldable cart in accordance with claim 1, wherein there are two foldable shelf members in addition to said bottom-most stabilizing shelf member.

3. A collapsible, foldable cart in accordance with claim 1, wherein said stabilizing member includes a pair of notches for detachably connecting said stabilizing member to said wheel axle.

4. A collapsible, foldable cart in accordance with claim 1, wherein said frame and said handle section are made from anyone of plastic aluminum, steel, stainless steel or fiberglass.

5. A collapsible, foldable cart in accordance with claim 4, wherein said frame and said handle section are in the form of tubular or flat-bar construction materials.

6. A collapsible, foldable cart in accordance with claim 1, wherein said wheels are made of plastic or rubber.

* * * * *